United States Patent
Goel (10) Patent No.: US 11,652,782 B1
(45) Date of Patent: May 16, 2023

(54) METHODS, SYSTEMS, AND COMPUTER READABLE MEDIA FOR DYNAMICALLY UPDATING DOMAIN NAME SYSTEM (DNS) RECORDS FROM REGISTERED NETWORK FUNCTION (NF) PROFILE INFORMATION

(71) Applicant: Oracle International Corporation, Redwood Shores, CA (US)

(72) Inventor: Yesh Goel, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/534,914

(22) Filed: Nov. 24, 2021

(51) Int. Cl.
*H04L 61/4511* (2022.01)
*H04L 61/251* (2022.01)
*H04L 61/5076* (2022.01)
*H04L 61/3015* (2022.01)
*H04W 84/04* (2009.01)
*H04L 61/30* (2022.01)

(52) U.S. Cl.
CPC ........ *H04L 61/4511* (2022.05); *H04L 61/251* (2013.01); *H04L 61/3025* (2013.01); *H04L 61/5076* (2022.05); *H04L 61/30* (2013.01); *H04W 84/042* (2013.01)

(58) Field of Classification Search
CPC ............. H04L 61/4511; H04L 61/5076; H04L 61/251; H04L 61/3025; H04L 61/30; H04W 84/042
USPC .......................................................... 709/245
See application file for complete search history.

(56) References Cited

U.S. PATENT DOCUMENTS

| | | | |
|---|---|---|---|
| 10,205,701 B1 * | 2/2019 | Voss .................... | H04L 61/4511 |
| 10,375,016 B1 * | 8/2019 | Vavrusa .................. | H04L 12/18 |
| 10,785,166 B1 * | 9/2020 | Rothschild ............ | H04L 67/563 |
| 10,887,276 B1 * | 1/2021 | Parulkar ............. | H04L 61/4511 |
| 11,005,949 B1 * | 5/2021 | Baturin ............... | H04L 61/4511 |
| 11,025,589 B1 * | 6/2021 | Muscariello ........... | H04L 45/20 |
| 11,038,840 B1 * | 6/2021 | Vettaikaran ......... | H04L 61/4511 |
| 11,095,534 B1 * | 8/2021 | Dunsmore .............. | H04L 67/51 |
| 11,271,894 B1 * | 3/2022 | McCarty ............... | H04L 9/0825 |

(Continued)

FOREIGN PATENT DOCUMENTS

KR  101097706 B1  12/2011

OTHER PUBLICATIONS

"3rd Generation Partnership Project; Technical Specification Group Core Network and Terminals; Domain Name System Procedures; Stage 3 (Release 17)," 3GPP TS 29.303, V17.1.0, pp. 1-82 (Mar. 2021).

(Continued)

*Primary Examiner* — Melvin H Pollack
(74) *Attorney, Agent, or Firm* — Jenkins, Wilson, Taylor & Hunt, P.A.

(57) ABSTRACT

A method for dynamically updating domain name system (DNS) records from network function (NF) profile information includes, at an NF repository function (NRF) including at least one processor, receiving a message relating to an NF profile of an NF. The method further includes constructing, based on NF service availability information in the NF profile and local configuration of the NRF, a DNS resource record for the NF. The method further includes utilizing a dynamic DNS update procedure to dynamically update a DNS resource record for the NF with a DNS server.

20 Claims, 5 Drawing Sheets

(56) References Cited

U.S. PATENT DOCUMENTS

| | | | |
|---|---|---|---|
| 2018/0191666 A1* | 7/2018 | Rahman | H04L 67/51 |
| 2019/0044980 A1* | 2/2019 | Russell | H04W 8/06 |
| 2019/0081924 A1* | 3/2019 | White | H04L 43/0835 |
| 2019/0097965 A1* | 3/2019 | Linari | H04L 63/168 |
| 2019/0238498 A1* | 8/2019 | Cleary | H04L 63/08 |
| 2019/0306111 A1* | 10/2019 | Tang | H04L 43/0864 |
| 2020/0084178 A1* | 3/2020 | Dreyer | H04L 41/0856 |
| 2020/0329008 A1* | 10/2020 | Dao | G06F 16/953 |
| 2020/0382584 A1* | 12/2020 | Basavaiah | H04L 47/783 |
| 2020/0403911 A1* | 12/2020 | Singhal | H04L 45/34 |
| 2021/0021634 A1* | 1/2021 | Babakian | G06F 9/45558 |
| 2021/0067480 A1 | 3/2021 | Goel | |
| 2021/0092088 A1* | 3/2021 | Ramachandran | H04L 63/1408 |
| 2021/0099415 A1* | 4/2021 | Kanagarathinam | H04L 69/16 |
| 2021/0126892 A1* | 4/2021 | Maskara | H04L 69/40 |
| 2021/0168127 A1* | 6/2021 | Jensen | H04L 9/3263 |
| 2021/0203631 A1* | 7/2021 | Uchikawa | H04L 61/4552 |
| 2021/0250411 A1 | 8/2021 | Cakulev et al. | |
| 2021/0258766 A1* | 8/2021 | Watanabe | H04W 48/16 |
| 2021/0282078 A1 | 9/2021 | Martinez De La Cruz et al. | |
| 2021/0306875 A1 | 9/2021 | Zhang et al. | |
| 2021/0321245 A1* | 10/2021 | Landais | H04L 61/4511 |
| 2021/0328967 A1* | 10/2021 | Albrecht | H04L 61/3015 |
| 2021/0351993 A1 | 11/2021 | Pestana | |
| 2021/0385286 A1 | 12/2021 | Wang et al. | |
| 2021/0392197 A1* | 12/2021 | Yang | H04L 67/306 |
| 2021/0400010 A1* | 12/2021 | Uchikawa | H04L 61/10 |
| 2022/0006726 A1* | 1/2022 | Michael | H04L 45/123 |
| 2022/0014939 A1* | 1/2022 | Colom Ikuno | G06F 9/541 |
| 2022/0030649 A1* | 1/2022 | Popescu | H04W 76/15 |
| 2022/0052961 A1* | 2/2022 | Chauhan | H04L 47/783 |
| 2022/0116381 A1* | 4/2022 | Bosch | H04L 63/126 |
| 2022/0131830 A1* | 4/2022 | Dodd-Noble | H04L 61/2585 |
| 2022/0132358 A1* | 4/2022 | Peng | H04W 28/0289 |
| 2022/0191100 A1* | 6/2022 | Kim | H04M 15/66 |
| 2022/0200847 A1* | 6/2022 | Bartolome Rodrigo | H04L 67/563 |
| 2022/0239696 A1* | 7/2022 | Konda | H04L 61/4511 |
| 2022/0256040 A1* | 8/2022 | Kahn | H04M 15/7556 |

OTHER PUBLICATIONS

"3rd Generation Partnership Project; Technical Specification Group Services and System Aspects; Security architecture and procedures for 5G System (5GS) (Release 17)," 3GPP TS 33.501, V17.3.0, pp. 1-258 (Sep. 2021).

"3rd Generation Partnership Project; Technical Specification Group Services and System Aspects; Procedures for the 5G System (5GS); Stage 2 (Release 17)," 3GPP TS 23.502, V17.2.1, pp. 1-712 (Sep. 2021).

"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).

"3rd Generation Partnership Project; Technical Specification Group Services and System Aspects; System architecture for the 5G System (5GS); Stage 2 (Release 17)," 3GPP TS 23.501, V17.2.0, pp. 1-542 (Sep. 2021).

"3rd Generation Partnership Project; Technical Specification Group Core Network and Terminals; Numbering, addressing and identification; (Release 17)," 3GPP TS 23.003, V17.3.0, pp. 1-145 (Sep. 2021).

"3rd Generation Partnership Project; Technical Specification Group Core Network and Terminals; 5G System; Network Function Repository Services; Stage 3 (Release 17)," 3GPP TS 29.510, V17.3.0 pp. 1-271 (Sep. 2021).

"3rd Generation Partnership Project; Technical Specification Group Core Network and Terminals; 5G System; Session Management Services; Stage 3 (Release 17)," 3GPP TS 29.502, V17.2.0, pp. 1-306 (Sep. 2021).

"3rd Generation Partnership Project; Technical Specification Group Core Network and Terminals; 5G System; Principles and Guidelines for Services Definition; Stage 3 (Release 17)," 3GPP TS 29.501, V17.3.1, pp. 1-78 (Sep. 2021).

Vixie et al., "Dynamic Updates in the Domain Name System (DNS Update)," Network Working Group, Request for Comments 2136, pp. 1-26 (Apr. 1997).

Non-Final Office Action for U.S. Appl. No. 17/534,904 (dated Jun. 15, 2022).

Commonly-assigned, Co-pending U.S. Appl. No. 17/534,904 for "Methods, Systems, and Computer Readable Media for Automatic Domain Name System (DNS) Configuration for U5G Core (5GC) Network Functions (NFs) Using NF Repository Function (NRF)," (Unpublished, filed Nov. 24, 2021).

Notification of Transmittal of the International Search Report and the Written Opinion of the International Searching Authority, or the Declaration for International Patent Application No. PCT/US2022/050011 (dated Feb. 6, 2023).

"3rd Generation Partnership Project; Technical Specification Group Core Network and Terminals; 5G System—Phase 1; CT WG4 Aspects (Release 16)", 3GPP TR 29.891, V16.0.0, pp. 1-146 (Jul. 2020).

Nokia, et al., "AMF Discovery by 5G-AN", 3GPP TSG CT WG4 Meeting #86, C4-186486, pp. 1-5 (Aug. 2018).

Notification of Transmittal of the International Search Report and the Written Opinion of the International Searching Authority, or the Declaration for International Patent Application No. PCT/US2022/050010 (dated Feb. 1, 2023).

Final Office Action for U.S. Appl. No. 17/534,904 (dated Dec. 1, 2022).

Advisory Action for U.S. Appl. No. 17/534,904 (dated Mar. 22, 2023).

Applicant-Initiated Interview Summary for U.S. Appl. No. 17/534,904 (dated Mar. 13, 2023).

* cited by examiner

METHODS, SYSTEMS, AND COMPUTER READABLE MEDIA FOR DYNAMICALLY UPDATING DOMAIN NAME SYSTEM (DNS) RECORDS FROM REGISTERED NETWORK FUNCTION (NF) PROFILE INFORMATION

TECHNICAL FIELD

The subject matter described herein relates to dynamic DNS configuration. More particularly, the subject matter described herein relates to methods, systems, and computer readable media for dynamically updating DNS records from registered NF profile information.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can obtain information about producer NF instances that have registered with the NRF through the NF service discovery procedure. According to the NF service discovery procedure, a consumer NF sends an NF discovery request to the NRF. The NF discovery request includes query parameters that the NRF uses to locate NF profiles of producer NFs capable of providing the service identified by the query parameters. NF profiles are data structures that define the type of service provided by a producer NF instance as well as contact and capacity information regarding the producer NF instance.

In addition to consumer NFs, another type of network node that can invoke the NF service discovery procedure to obtain information about NF service instances is a service communication proxy (SCP). The case where the SCP uses the NF service discovery procedure to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances. The communications model where consumer NFs communicate with producer NFs via the SCP is referred to as the indirect communications model.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem that can occur in 5G and other communications networks is that network functions can be associated with many different fully qualified domain names (FQDNs), and the network functions (NFs) are required to maintain DNS resource records for the domain names. For example, network functions can have network function profile level FQDNs, inter-PLMN FQDNs, NF set level FQDNs, NF service level FQDNs, and standalone non-public network (SNPN) FQDNs. In addition, an FQDN may be associated with IPv4 address or an IPv6 address, which correspond to different types of DNS resource records. Depending on the configuration of an operator's network, the network functions may be required to maintain DNS resource records with one or more of the different FQDNs and/or IP address versions. Requiring each network function to maintain its own DNS resource records, especially in light of the variety of DNS resource records that may be required by a network operator for each NF, is undesirable. Accordingly, there exists a need for improved methods, systems, and computer readable media for dynamically updating DNS resource records from registered NF profile information.

SUMMARY

A method for dynamically updating domain name system (DNS) records from network function (NF) profile information includes, at an NF repository function (NRF) including at least one processor, receiving a message relating to an NF profile of an NF. The method further includes constructing, based on NF service availability information in the NF profile and local configuration of the NRF, a DNS resource record for the NF. The method further includes utilizing a dynamic DNS update procedure to dynamically update a DNS resource record for the NF with a DNS server.

According to another aspect of the subject matter described herein, receiving a message concerning an NF profile of the NF includes receiving an NF register or NF update message for registering or updating the NF profile of the NF and generating the DNS resource record includes generating a DNS A record or a DNS AAAA record using a fully qualified domain name (FQDN) and an IP address in the NF profile.

According to another aspect of the subject matter described herein, the FQDN comprises an NF profile or service level FQDN and the IP address comprises an NF profile or NF service level IP address and generating the DNS A record or the DNS AAAA record includes generating the DNS A or the DNS AAAA record mapping the NF profile or service level FQDN to the NF profile or service level IP address.

According to another aspect of the subject matter described herein, the FQDN comprises an inter-public land mobile network (inter-PLMN) FQDN.

According to another aspect of the subject matter described herein, the FQDN identifies an NF set.

According to another aspect of the subject matter described herein, the FQDN identifies a standalone non-public network (SNPN).

According to another aspect of the subject matter described herein, utilizing the dynamic DNS update procedure includes generating a dynamic DNS update message formatted according to Internet Engineering Task Force (IETF) Request for Comments (RFC) 2136 and transmitting the dynamic DNS update message to a DNS server.

According to another aspect of the subject matter described herein, receiving a message concerning the NF profile of the NF includes receiving an NF deregister message for deregistering the NF profile of the NF and utilizing the dynamic DNS update procedure to dynamically update a DNS resource record for the NF with a DNS includes utilizing the dynamic DNS update procedure to delete the DNS resource record for the NF with the DNS server.

According to another aspect of the subject matter described herein, the method includes, at the NRF, receiving one or more messages concerning NF profiles of different NFs that share an IP address or domain name and generating a single dynamic DNS update message for updating DNS resource records of the NFs with the DNS server.

According to another aspect of the subject matter described herein, the NF comprises a 4G or a 5G NF.

According to another aspect of the subject matter described herein, a system for dynamically updating domain name system (DNS) records from network function (NF) profile information is provided. The system includes an NF repository function (NRF) including at least one processor. The system further includes a dynamic DNS record constructor/updater for receiving a message relating to an NF profile of an NF, constructing, based on NF service availability information in the NF profile and local configuration of the NRF, a DNS resource record for the NF, and utilizing a dynamic DNS update procedure to dynamically update a DNS resource record for the NF with a DNS server.

According to another aspect of the subject matter described herein, the message relating to the NF profile of the NF comprises an NF register or NF update message for registering or updating the NF profile of the NF and the dynamic DNS record constructor/updater is configured to generate a DNS A record or a DNS AAAA record using a fully qualified domain name (FQDN) and an IP address in the NF profile.

According to another aspect of the subject matter described herein, the FQDN comprises an NF profile or NF service level FQDN and the IP address comprises an NF profile or NF service level IP address and the dynamic DNS record constructor/updater is configured to generate the DNS A or the DNS AAAA record mapping the NF profile or service level FQDN to the NF profile or service level IP address.

According to another aspect of the subject matter described herein, wherein the FQDN comprises an inter-public land mobile network (inter-PLMN) FQDN.

According to another aspect of the subject matter described herein, wherein the FQDN identifies an NF set.

According to another aspect of the subject matter described herein, the FQDN identifies a standalone non-public network (SNPN).

According to another aspect of the subject matter described herein, the dynamic DNS record constructor/updater is configured to generate a dynamic DNS update message formatted according to Internet Engineering Task Force (IETF) Request for Comments (RFC) 2136 and transmit the dynamic DNS update message to a DNS server.

According to another aspect of the subject matter described herein, the message concerning the NF profile of the NF includes an NF deregister message for deregistering the NF profile of the NF and the dynamic DNS record constructor/updater is configured to utilize the dynamic DNS update procedure to delete the DNS resource record for the NF with the DNS server.

According to another aspect of the subject matter described herein, the dynamic DNS record constructor/updater is configured to receive one or more messages concerning NF profiles of different NFs that share an IP address or domain name and generate a single dynamic DNS update message for updating DNS resource records of the NFs with the DNS server.

According to another aspect of the subject matter described herein, one or more non-transitory computer readable media having stored thereon executable instructions that when executed by a processor of a network function (NF) repository function (NRF) control the NRF to perform steps are provided. The steps include receiving a message relating to an NF profile of an NF. The steps further include constructing, based on NF service availability information in the NF profile and local configuration of the NRF, a domain name system (DNS) resource record for the NF. The steps further include utilizing a dynamic DNS update procedure to dynamically update a DNS resource record for the NF with a DNS server.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
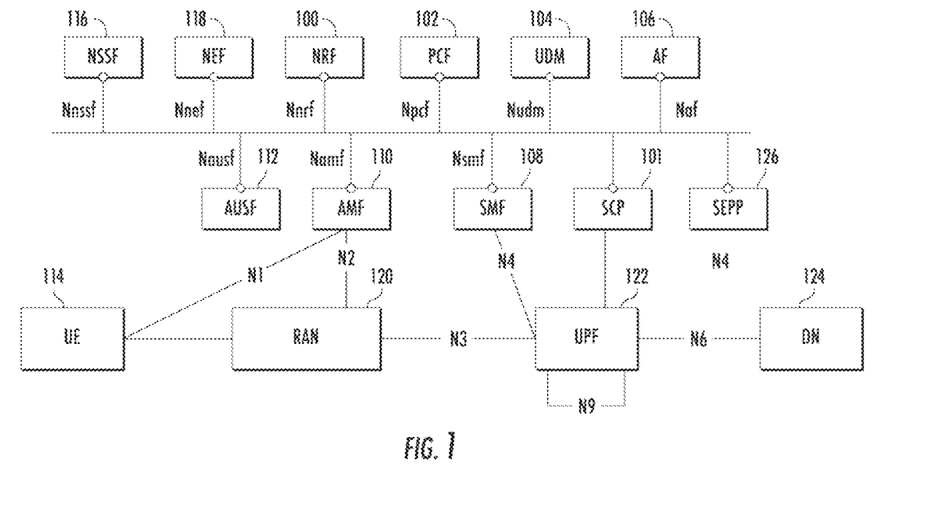
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management (UDM) function 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

As stated above, one problem that can occur in 5G and other networks is that network operators can use different FQDNs and different IP address versions to identify 4G and 5G NFs, and 4G and 5G NFs are required to maintain their own DNS resource records for the FQDNs and IP address versions with DNS servers. Currently, as per 3GPP specifications (i.e., 3GPP TS 29.501/29.502), all 5G (and some 4G NFs) register their NF profiles with the NRF. The NRF thus maintains the NF profile(s) of available NF instances and their supported services. The NF profiles registered by these NFs contain service accessibility information in the following attributes:

Fqdn
    interPlmnFqdn
    ipv4Addresses
    ipv6Addresses NF services registered in NF profile(s) (i.e., nfServices (3GPP Release 15)/nfServiceList (3GPP Release 16) also define service accessibility information in the following attributes:

Fqdn
    interPlmnFqdn
    ipEndPoints Additionally, 3GPP specifications in many cases mandate that NFs form FQDNs in defined formats. Some examples are as follows:

Local FQDNs exposed to consumer NFs within the same PLMN (defined in 3GPP TS 29.510)
    Inter-PLMN FQDNs (i.e. FQDNs exposed to consumer NFs from different PLMNs) (defined in 3GPP TS 29.510)
    NF set/NF service set based FQDNs (i.e., FQDNs that represent multiple NFs in an NF set or NF service set) (defined in 3GPP TS 23.003)
    FQDNs of NFs in an operator's SNPN (defined in 3GPP TS 23.003)
    FQDNs exposed to nodes outside of the 5GC network (e.g., an AMF exposing the N2 interface to a gNB, etc.)

Figure 2:
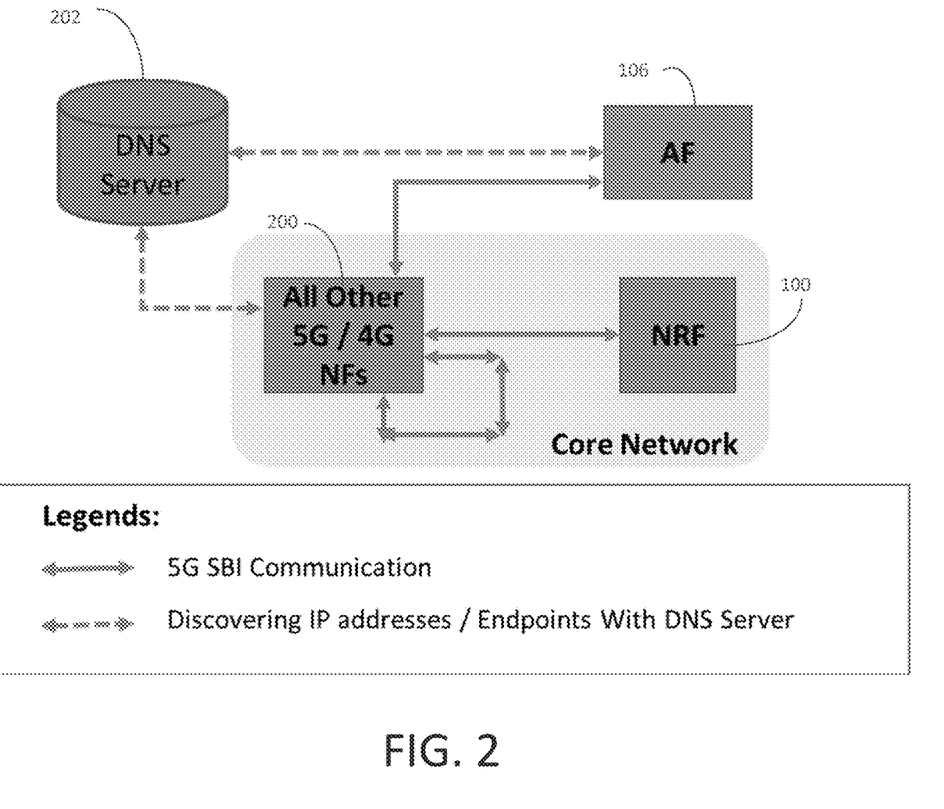
FIG. 2 is a network diagram illustrating the current 5GC network where network functions maintain their own DNS resource records.

As stated above, NFs are required to update their own profiles with the DNS server for the FQDNs contained in the NF profiles. FIG. 2 is a network diagram illustrating the existing 4G and 5G network where NFs maintain their own DNS resource records. In FIG. 2, 5G and 4G NFs 200 register their NF profiles with NRF 100. 5G and 4G NFs 200 communicate with other NFs, such as AF 106, by discovering FQDNs of other NFs from NRF 100 and resolving the FQDNs into IP addresses by querying DNS server 202. 5G and 4G NFs 200 and AF 106 are required to create and maintain DNS resource records with DNS server 202. Such a system is burdensome on individual network functions.

In order to avoid the difficulties associated with each NF maintaining its own DNS resource records for the various different types of FQDNs that may be used to identify an NF, the subject matter described herein includes configuring the NRF to maintain DNS records on behalf of other NFs using a dynamic DNS update procedure. The NRF may, upon receiving NF register(s)/NRF update(s)/NF deregister(s) from other 5GC NFs, use dynamic DNS updates as described in Internet Engineering Task Force (IETF) Request for Comments (RFC) 2136 to add/update/delete DNS entries at the DNS server based on following parameters:

NF Profile→fqdn
    NF Profile→interPlmnFqdn
    NF Profile→ipv4Addresses
    NF Profile→ipv6Addresses
    NF Profile→NF Service→fqdn NF Profile→NF Service→interPlmnFqdn NF Profile→NF Service→ipEndPoints NF Profile→nfSetIdList NF Profile→NF Service→nfServiceSetIdList NF Profile→Nid The NRF may construct 3GPP-defined FQDNs to be used in DNS records based on local settings/preferences and the above-listed parameters from an NF profile. The 3GPP-defined FQDNs that may be constructed include:

Local FQDNs exposed to consumer NFs within a PLMN (defined in 3GPP TS 29.510);

Inter-PLMN FQDNs (i.e., FQDNs exposed to consumer NFs from different PLMNs) (defined in 3GPP TS 29.510);

NF set/NF service set based FQDNs (i.e., FQDNs that represent multiple NFs in an NF set or NF service set) (defined in 3GPP TS 23.003); and FQDNs of NFs in an operator's SNPN (defined in 3GPP TS 23.003).

It may be possible that the same FQDN and/or IP address is being shared across multiple NFs. In such a case, the NRF may consult its NF profiles database to consolidate the changes in DNS entries before sending the dynamic updates to the DNS server. For example, if multiple producer NFs are located behind an API gateway or load balancer, and the IP address of the API gateway or load balancer changes, the NRF may send a single dynamic DNS update message to update the DNS resource records of all of the producer NFs located behind the API gateway.

Figure 3:
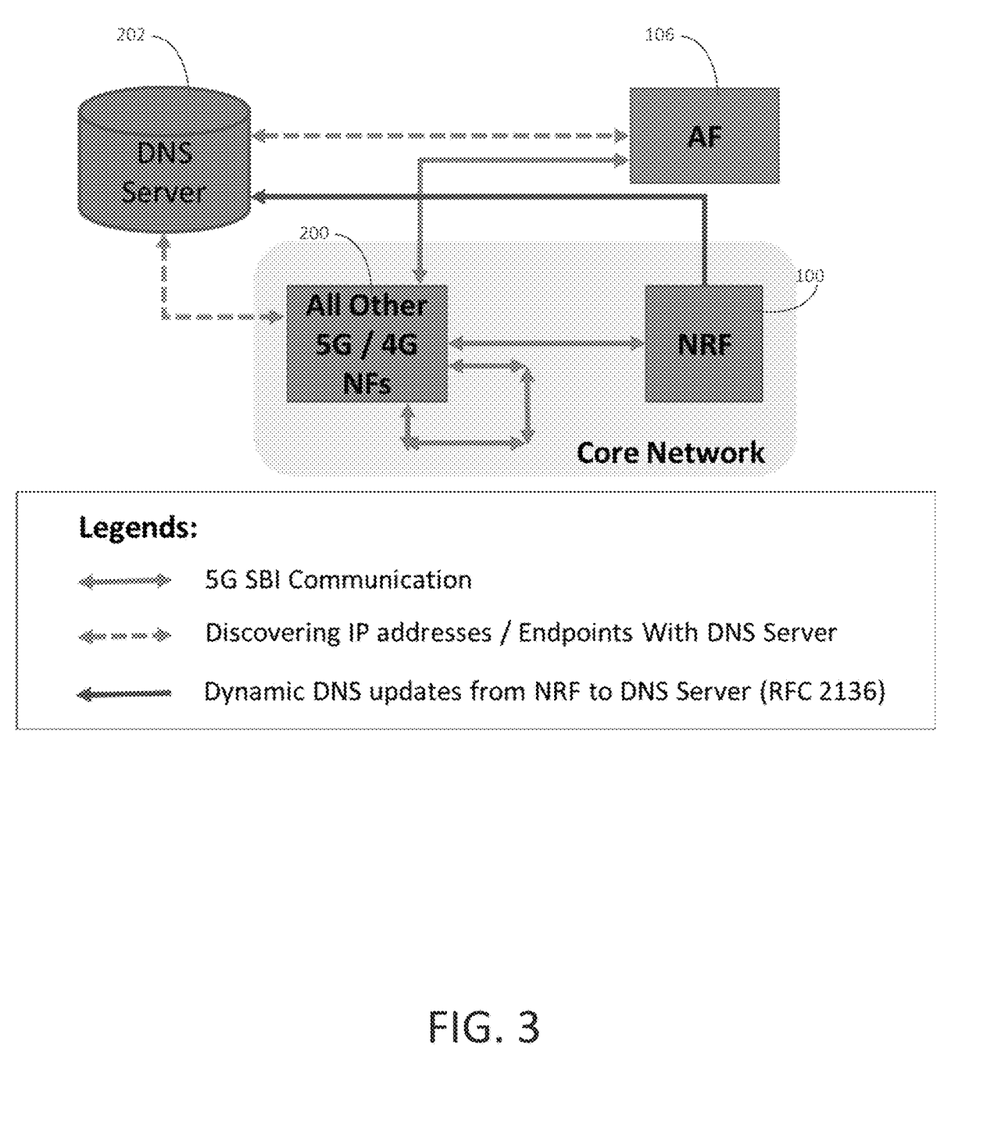
FIG. 3 is a network diagram illustrating an exemplary system for dynamically updating DNS records using registered NF profile information.

FIG. 3 is a network diagram illustrating a core network where the NRF constructs DNS resource records from NF profile parameters and dynamically updates DNS resource records for 5G and 4G NFs. In FIG. 3, 5G and 4G NFs 200 register their NF profiles with NRF 100. 5G and 4G NFs 200 communicate with other NFs, such as AF 106, by discovering FQDNs of other NFs from NRF 100 and resolving the FQDNs into IP addresses by querying DNS server 202. NRF 100 creates and maintains DNS resource records for 5G and 4G NFs with DNS server 202. For example, when NRF 100 receives an NF register message for registering the NF profile of a 4G or 5G NF, NRF 100 extracts service availability information (e.g., the FQDN and IP address(es)) from the NF profile, constructs one or more DNS resource records using the service availability information, and sends a dynamic DNS update message to DNS server 202 automatically create or update the DNS resource records for the 4G or 5G NF. When NRF 100 receives an NF update message for updating the NF profile of a 4G or 5G NF, NRF 100 extracts service availability information (e.g., the FQDN and IP address(es)) from the full or partial NF profile carried in the NF update message, constructs one or more DNS resource records using the service availability information, and sends a dynamic DNS update message to DNS server 202 automatically create or update the DNS resource records for the 4G or 5G NF. When NRF 100 receives an NF deregister message for deregistering the NF profile of a 4G or 5G NF, NRF 100 extracts the NF instance identifier, constructs and sends a dynamic DNS update message to DNS server 202 to delete one or more DNS resource records for the 4G or 5G NF.

As state above, the dynamic DNS update procedure in IETF RFC 2136 may be used to dynamically update DNS records for the 4G or 5G NF. The format for the dynamic DNS update message is as follows:

```
+--------------+
|    Header    |
+--------------+
|     Zone     |    specifies the zone to be updated
+--------------+    RRs or RRsets which must (not) preexist
| Prerequisite |    RRs or RRsets to be added or deleted
+--------------+    additional data
|    Update    |
+--------------+
| Additional Data |
+--------------+
```

According to the specified message format, the header identifies the type of message, which, in the case of the NRF sending a message to the DNS server, would be an update message. The zone specifies the DNS zone to be updated. The prerequisites section identifies DNS resource records that must or must not exist as prerequisites to the updates specified in the update section. The update portion of the message carries the DNS resource records constructed by the NRF from the NF service availability parameters extracted from the NF profile. The additional data section contains additional data, that is not important in explaining the functionality of the NRF in performing dynamic DNS updates.

Table 1 shown below illustrates exemplary operations that may be performed by the NRF in building DNS resource records from NF profile parameters. For example, in the row in Table 1 after the header, the FQDN and the IP address are at the NF profile level (i.e., they identify the NF represented by the NF profile). In such a case, the NRF builds a DNS A record mapping the NF profile level FQDN to the NF profile level IPv4 address and a DNS AAAA record mapping the NF profile level FQDN to the NF profile level IPv6 address. The remaining scenarios in Table 1 are examples where the NRF builds DNS resource records from different level (NF profile, NF service, NF set, NF service set) NF profile parameters (FQDNs and IP addresses).

TABLE 1

NF Profile Attribute to DNS Record Conversion

| Scenario | NF Profile Parameters | DNS Records formed |
|---|---|---|
| FQDN and IP Addresses at NF profile level in NF profile | NF Profile → fqdn (e.g. NF1.example.com)<br>NF Profile → ipv4Addresses (10.20.20.25)<br>NF Profile → ipv6Addresses (2001:db8:3333:4444:CCCC:DDDD:EEEE:FFFF) | DNS A Record:<br>NF1.example.com 10.20.20.25<br>DNS AAAA Record:<br>NF1.example.com 2001:db8:3333:4444:CCCC:DDDD:EEEE:FFFF |
| FQDN and IP addresses at NF Service Level in NF Profile | NF Profile -> NF Service -> fqdn (svc1.NF1.example.com)<br>NF Profile -> NF Service -> ipEndPoints -> ipv4Address (10.20.20.30)<br>NF Profile -> NF Service -> ipEndPoints -> ipv6Address (2001:db8:3333:5555:CCCC:DDDD:EEEE:FFFF) | DNS A Record:<br>svc1.NF1.example.com 10.20.20.30<br>DNS AAAA Record:<br>svc1.NF1.example.com 2001:db8:3333:5555:CCCC:DDDD:EEEE:FFFF |
| FQDN at NF Profile Level and IP Addresses | NF Profile > fqdn (e.g. NF1.example.com)<br>NF Profile -> NF Service -> ipEndPoints -> ipv4Address (10.20.20.35)<br>NF Profile -> NF Service -> | DNS A Record:<br>NF1.example.com 10.20.20.35<br>DNS AAAA Record:<br>NF1.example.com 2001:db8:3333:6666:CCCC:DDDD:EEEE:FFFF |

TABLE 1-continued

NF Profile Attribute to DNS Record Conversion

| Scenario | NF Profile Parameters | DNS Records formed |
|---|---|---|
| at NF Service Level FQDN at NF Service Level IP Addresses at NF Level | ipEndPoints -> ipv6Address (2001:db8:3333:6666:CCCC:DDDD:EEEE:FFFF) NF Profile -> NF Service -> fqdn (svc2.NF2.example.com) NF Profile > ipv4Addresses (10.20.20.40) NF Profile > ipv6Addresses (2001:db8:3333:7777:CCCC:DDDD:EEEE:FFFF) | DNS A Record: svc2.NF2.example.com 10.20.20.40 DNS AAAA Record: svc2.NF2.example.com 2001:db8:3333:7777:CCCC:DDDD:EEEE:FFFF |
| Inter-PLMN FQDN and IP Addresses at NF Profile level in NF Profile | NF Profile -> interPlmnFqdn (NF1.5gc.mnc012.mcc345.3gppnetwork.org) NF Profile -> ipv4Addresses (10.20.20.45) NF Profile -> ipv6Addresses (2001:db8:3333:8888:CCCC:DDD:EEEE:FFFF) | DNS A Record: NF1.example.com 10.20.20.25 DNS AAAA Record: NF1.example.com 2001:db8:3333:4444:CCCC:DDDD:EEEE:FFFF |
| Inter-PLMN FQDN and IP addresses at NF Service Level in NF Profile | NF Profile -> interPlmnFqdn (NF1.5gc.mnc012.mcc345.3gppnetwork.org) NF Profile -> NF Service -> ipEndPoints -> ipv4Address (10.20.20.55) NF Profile -> NF Service -> ipEndPoints -> ipv6Address (2001:db8:3333:AAAA:CCCC:DDDD:EEEE:FFFF) | DNS A Record: svc1.NF1.example.com 10.20.20.30 DNS AAAA Record: svc1.NF1.example.com 2001:db8:3333:5555:CCCC:DDDD:EEEE:FFFF |
| Inter-PLMN FQDN at NF Profile Level and IP Addresses at NF Service Level | NF Profile -> interPlmnFqdn (NF1.5gc.mnc012.mcc345.3gppnetwork.org) NF Profile -> NF Service -> ipEndPoints -> ipv4Address (10.20.20.55) NF Profile -> NF Service -> ipEndPoints -> ipv6Address (2001:db8:3333:AAAA:CCCC:DDDD:EEEE:FFFF) | DNS A Record: svc1.NF1.example.com 10.20.20.30 DNS AAAA Record: svc1.NF1.example.com 2001:db8:3333:5555:CCCC:DDDD:EEEE:FFFF |
| Inter-PLMN FQDN at NF Service Level IP Addresses at NF Level | NF Profile -> interPlmnFqdn (NF1.5gc.mnc012.mcc345.3gppnetwork.org) NF Profile -> NF Service -> ipEndPoints -> ipv4Address (10.20.20.55) NF Profile -> NF Service -> ipEndPoints -> ipv6Address (2001:db8:3333:AAAA:CCCC:DDDD:EEEE:FFFF) | DNS A Record: svc2.NF2.example.com 10.20.20.40 DNS AAAA Record: svc2.NF2.example.com 2001:db8:3333:7777:CCCC:DDDD:EEEE:FFFF |
| NF Set based FQDNs(.e. FQDNs represent multiple NFs in NF Set) | NF Profile -> nfSetIdList -> NF Set Id (setPOLICYSET.PCFset.5gc.mnc012.mcc345.3gppnetwork.org) NF Profile > ipv4Addresses (10.20.20.65) NF Profile > ipv6Addresses (2001:db8:3333:0101:CCCC:D DDD:EEEE:FFFF) | DNS A Record: setPOLICYSET.PCFset.5gc.mnc012.mcc345.3gppnetwork.org 10.20.20.65 DNS AAAA Record: setPOLICYSET.PCFset.5gc.mnc012.mcc345.3gppnetwork.org 2001:db8:3333:0101:CCCC:DDDD:EEEE:FFFF |
| NF Service Set based FQDNs(.e. FQDNs represent multiple NF Service Instances | NF Profile -> NF Service -> nfServiceSetIdList -> NF Service Set Id (setPOLICYSET.snnpcf-svc1.nfi54804518-4191-46b3-955c-ac631f953ed8.5gc.mnc012.mcc345.3gppnetwork.org) NF Profile -> NF Service -> ipEndPoints -> ipv4Address | DNS A Record: setPOLICYSET.snnpcf-svc1.nfi54804518-4191-46b3-955c-ac631f953ed8.5gc.mnc012.mcc345.3gppnetwork.org 10.20.20.70 DNS AAAA Record: setPOLICYSET.snnpcf-svc1.nfi54804518-4191-46b3- |

TABLE 1-continued

NF Profile Attribute to DNS Record Conversion

| Scenario | NF Profile Parameters | DNS Records formed |
|---|---|---|
| in NF Service Set) | (10.20.20.70) NF Profile -> NF Service -> ipEndPoints -> ipv6Address (2001:db8:3333:ABBA:CCCC:D DDD:EEEE:FFFF) | 955c-ac631f953ed8.5gc.mnc012.mcc345.3gppnetwork.org 2001:db8:3333:0101:CCCC:DDDD:EEEE:FFFF |
| FQDN of NFs in operator's SNPN | NF Profile -> nfSetIdList -> NF Set Id (setPOLICYSET.PCFset.5gc.mnc012.mcc345.3gppnetwork.org) NF Profile > ipv4Addresses (10.20.20.70) NF Profile > ipv6Addresses (2001:db8:3333:ABBD:CCCC:D DDD:EEEE:FFFF) Nid:000007ed9d5 | DNS A Record: setPOLICYSET.PCFset.5gc.nid000007ed9d5.mnc012.mcc345.3gppnetwork.org 10.20.20.70 DNS AAAA Record: setPOLICYSET.PCFset.5gc.nid000007ed9d5.mnc012.mcc345.3gppnetwork.org 2001:db8:3333:ABBD:CCCC:DDDD:EEEE:FFFF |

Figure 4:
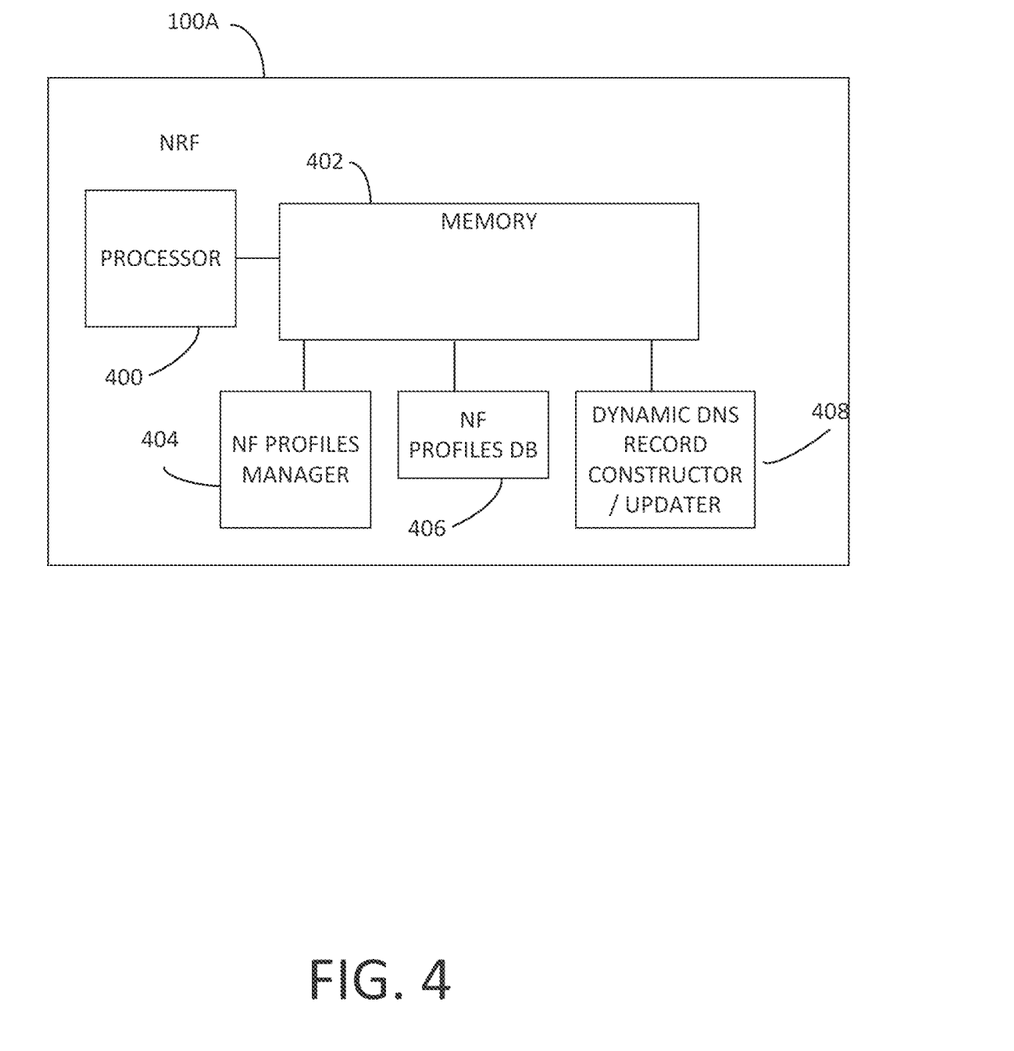
FIG. 4 is a block diagram illustrating an exemplary architecture for an NRF for dynamically updating DNS records from registered NF profile information.

FIG. 4 is a block diagram illustrating an exemplary architecture for an NRF for dynamically updating DNS records using registered NF profile information. Referring to FIG. 4, NRF 100 includes at least one processor 400 and memory 402. NRF 100 further includes an NF profiles manager 404 and an NF profiles database 406. NF profiles manager 404 receive NF register, NF update, and NF deregister message and registers, updates, and deregisters the corresponding NF profiles in NF profiles database 406. NRF profiles manager 404 may also handle NF discovery request that allows other NFs to subscribe to receive updates in registered NF profiles.

NRF 100 further includes a dynamic DNS record constructor/updater 408, which constructs DNS resource records for NFs based on NF service availability information obtained from messages concerning NF profiles of the NFs and local configuration of the NRF and that uses the DNS dynamic update procedure to update DNS resource records with a DNS server. For example, if dynamic DNS record constructor/updater 408 receives an NF register message for registering the NF profile of an NF and is configured to generate a DNS resource record at the NF profile level, DNS record constructor/updater 408 may read the NF profile level FQDN and NF profile level IP address from the NF profile transmitted with the NF register message, construct a DNS A or AAAA record containing the NF profile level FQDN and the NF profile level IP address, generate a dynamic DNS update message including the DNS A or AAAA record, and transmit the dynamic DNS update message to a DNS server.

In another example, if dynamic DNS record constructor/updater 408 receives an NF update message for updating the NF profile of an NF and is configured to generate a DNS resource record at the NF service level, dynamic DNS record constructor/updater 408 may read the NF service level FQDN and NF service level IP address from the NF profile transmitted with the NF register message, construct a DNS A or AAAA record containing the NF service level FQDN and the NF service level IP address, generate a dynamic DNS update message including the DNS A or AAAA record, and transmit the dynamic DNS update message to a DNS server.

In yet another example, if dynamic DNS record constructor/updater 408 receives an NF deregister message for deregistering the NF profile of an NF that is currently registered with NRF 100, dynamic DNS record constructor/updater 408 may read the NF instance identifier from the NF deregister message, generate a dynamic DNS update message including an identifier for the DNS resource record to be deleted, and transmit the dynamic DNS update message to a DNS server.

Figure 5:
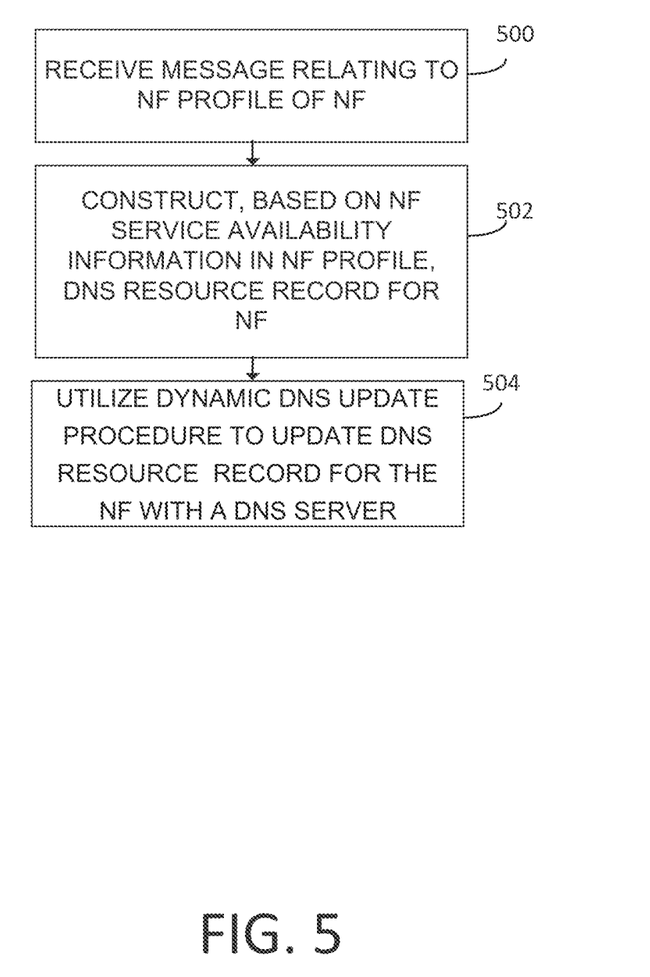
FIG. 5 is a flow chart illustrating an exemplary process for dynamically updating DNS resource records using registered NF profile information.

FIG. 5 is a flow chart illustrating an exemplary process for dynamically updating DNS records for NFs. Referring to FIG. 5, in step 500, the process includes receiving a message relating to an NF profile of an NF. For example, dynamic DNS record constructor/updater 408 may receive an NF register message, an NF update message, or an NF deregister message for registering, updating, or deregistering an NF profile of a 4G or 5G NF.

In step 502, the process includes constructing, based on NF service availability information in the NF profile and local configuration of the NRF, a DNS resource record for the NF. For example, if the received message is an NF register message or an NF update message, dynamic DNS record constructor/updater 408 may generate one or more DNS resource records using parameters in the NF profile. The DNS resource records may include an FQDN of the NF and an IP address of the NF. The type of FQDN used in the DNS resource records may depend on the local configuration of the NRF. For example, the FQDN used may be an NF profile level FQDN, an NF service level FQDN, an NF set level FQDN, or an NF service set level FQDN. The FQDN may also, in some instances be an inter-PLMN FQDN or an FQDN that identifies a private network, such as a stand-alone non-public network (SNPN).

In step 504, the process includes utilizing a dynamic DNS update procedure to dynamically update a DNS resource record for the NF with a DNS server. For example, dynamic DNS record constructor/updater 408 may generate a dynamic DNS update message using the format specified in IETF RFC 2136, insert the one or more DNS resource records in the dynamic DNS update message, and transmit the dynamic DNS update message to a DNS server.

The disclosure of each of the following references is incorporated herein by reference in its entirety.

REFERENCES 1. 3$^{rd}$ Generation Partnership Project; Technical Specification Group Core Network and Terminals; Numbering, addressing and identification; (Release 17) 3GPP TS 23.003 V17.3.0 (2021-09)
2. 3$^{rd}$ Generation Partnership Project; Technical Specification Group Core Network and Terminals; Technical Realization of Service Based Architecture (5GS); Stage 3 (Release 17) 3GPP TS 29.500 V17.4.0 (2021-09)
3. 3$^{rd}$ Generation Partnership Project; Technical Specification Group Services and System Aspects; System Architecture for the 5G System (5GS); Stage 2 (Release 17) 3GPP TS 23.501 V17.2.0 (2021-09)
4. 3$^{rd}$ Generation Partnership Project; Technical Specification Group Services and System Aspects; Procedures for the 5G System (5GS); Stage 2 (Release 17) 3GPP TS 23.502 V17.2.1 (2021-09)
5. 3$^{rd}$ Generation Partnership Project; Technical Specification Group Core Network and Terminals; Principles and Guidelines for Services Definition; Stage 3 (Release 17) 3GPP TS 29.501 V17.3.1 (2021-09)
6. 3$^{rd}$ Generation Partnership Project; Technical Specification Group Core Network and Terminals; 5G System; Network Function Repository Services; Stage 3 (Release 17) 3GPP TS 29.510 V17.3.0 (2021-09)
7. 3$^{rd}$ Generation Partnership Project; Technical Specification Group Services and System Aspects; Security architecture and procedures for 5G System (5GS) (Release 17) 3GPP TS 33.501 V17.3.0 (2021-09)
8. Vixie et al., "Dynamic Updates in the Domain Name System (DNS UPDATE)," Internet Engineering Task Force (IETF) Request for Comments (RFC) 2136 (April 1997)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for dynamically updating domain name system (DNS) records from network function (NF) profile information, the method comprising:
at an NF repository function (NRF) including at least one processor:
receiving a message relating to an NF profile of an NF;
constructing, based on NF service availability information in the NF profile and local configuration of the NRF, a DNS resource record for the NF; and
utilizing a dynamic DNS update procedure to dynamically update a DNS resource record for the NF with a DNS server separate from the NRF.

2. The method of claim 1 wherein receiving a message concerning an NF profile of the NF includes receiving an NF register or NF update message for registering or updating the NF profile of the NF and wherein generating the DNS resource record includes generating a DNS A record or a DNS AAAA record using a fully qualified domain name (FQDN) and an IP address in the NF profile.

3. The method of claim 2 wherein the FQDN comprises an NF profile or service level FQDN and the IP address comprises an NF profile or NF service level IP address and generating the DNS A record or the DNS AAAA record includes generating the DNS A or the DNS AAAA record mapping the NF profile or service level FQDN to the NF profile or service level IP address.

4. The method of claim 3 wherein the FQDN comprises an inter-public land mobile network (inter-PLMN) FQDN.

5. The method of claim 3 wherein the FQDN identifies an NF set.

6. The method of claim 3 wherein the FQDN identifies a standalone non-public network (SNPN).

7. The method of claim 1 wherein utilizing the dynamic DNS update procedure includes generating a dynamic DNS update message formatted according to Internet Engineering Task Force (IETF) Request for Comments (RFC) 2136 and transmitting the dynamic DNS update message to a DNS server.

8. The method of claim 1 wherein receiving a message concerning the NF profile of the NF includes receiving an NF deregister message for deregistering the NF profile of the NF and wherein utilizing the dynamic DNS update procedure to dynamically update a DNS resource record for the NF with a DNS server includes utilizing the dynamic DNS update procedure to delete the DNS resource record for the NF with the DNS server.

9. The method of claim 1 comprising, at the NRF, receiving one or more messages concerning an NF profiles of different NFs that share an IP address or domain name and generating a single dynamic DNS update message for updating DNS resource records of the NFs with the DNS server.

10. The method of claim 1 wherein the NF comprises a 4G or a 5G NF.

11. A system for dynamically updating domain name system (DNS) records from network function (NF) profile information, the system comprising:
- an NF repository function (NRF) including at least one processor;
- a dynamic DNS record constructor/updater implemented by the at least one processor for receiving a message relating to an NF profile of an NF, constructing, based on NF service availability information in the NF profile and local configuration of the NRF, a DNS resource record for the NF, and utilizing a dynamic DNS update procedure to dynamically update a DNS resource record for the NF with a DNS server separate from the NRF.

12. The system of claim 11 wherein the message relating to the NF profile of the NF comprises an NF register or NF update message for registering or updating the NF profile of the NF and the dynamic DNS record constructor/updater is configured to generate a DNS A record or a DNS AAAA record using a fully qualified domain name (FQDN) and an IP address in the NF profile.

13. The system of claim 12 wherein the FQDN comprises an NF profile or service level FQDN and the IP address comprises an NF profile or NF service level IP address and the dynamic DNS record constructor/updater is configured to generate the DNS A or the DNS AAAA record mapping the NF profile or service level FQDN to the NF profile or service level IP address.

14. The system of claim 13 wherein the FQDN comprises an inter-public land mobile network (inter-PLMN) FQDN.

15. The system of claim 13 wherein the FQDN identifies an NF set.

16. The system of claim 13 wherein the FQDN identifies a standalone non-public network (SNPN).

17. The system of claim 11 wherein the dynamic DNS record constructor/updater is configured to generate a dynamic DNS update message formatted according to Internet Engineering Task Force (IETF) Request for Comments (RFC) 2136 and transmit the dynamic DNS update message to a DNS server.

18. The system of claim 11 wherein the message concerning the NF profile of the NF includes an NF deregister message for deregistering the NF profile of the NF and the dynamic DNS record constructor/updater is configured to utilize the dynamic DNS update procedure to delete the DNS resource record for the NF with the DNS server.

19. The system of claim 11 wherein the dynamic DNS record constructor/updater is configured to receive one or more messages concerning NF profiles of different NFs that share an IP address or domain name and generate a single dynamic DNS update message for updating DNS resource records of the NFs with the DNS server.

20. One or more non-transitory computer readable media having stored thereon executable instructions that when executed by a processor of a network function (NF) repository function (NRF) control the NRF to perform steps comprising:
- receiving a message relating to an NF profile of an NF;
- constructing, by the NRF and based on NF service availability information in the NF profile and local configuration of the NRF, a domain name system (DNS) resource record for the NF; and
- utilizing, by the NRF, a dynamic DNS update procedure to dynamically update a DNS resource record for the NF with a DNS server separate from the NRF.

* * * * *